R. A. CARTER, Jr.
METHOD OF SAMPLING A LIQUID, VAPOROUS, OR GASEOUS PRODUCT.
APPLICATION FILED JULY 3, 1919.
1,364,035.
Patented Dec. 28, 1920.
5 SHEETS—SHEET 1.
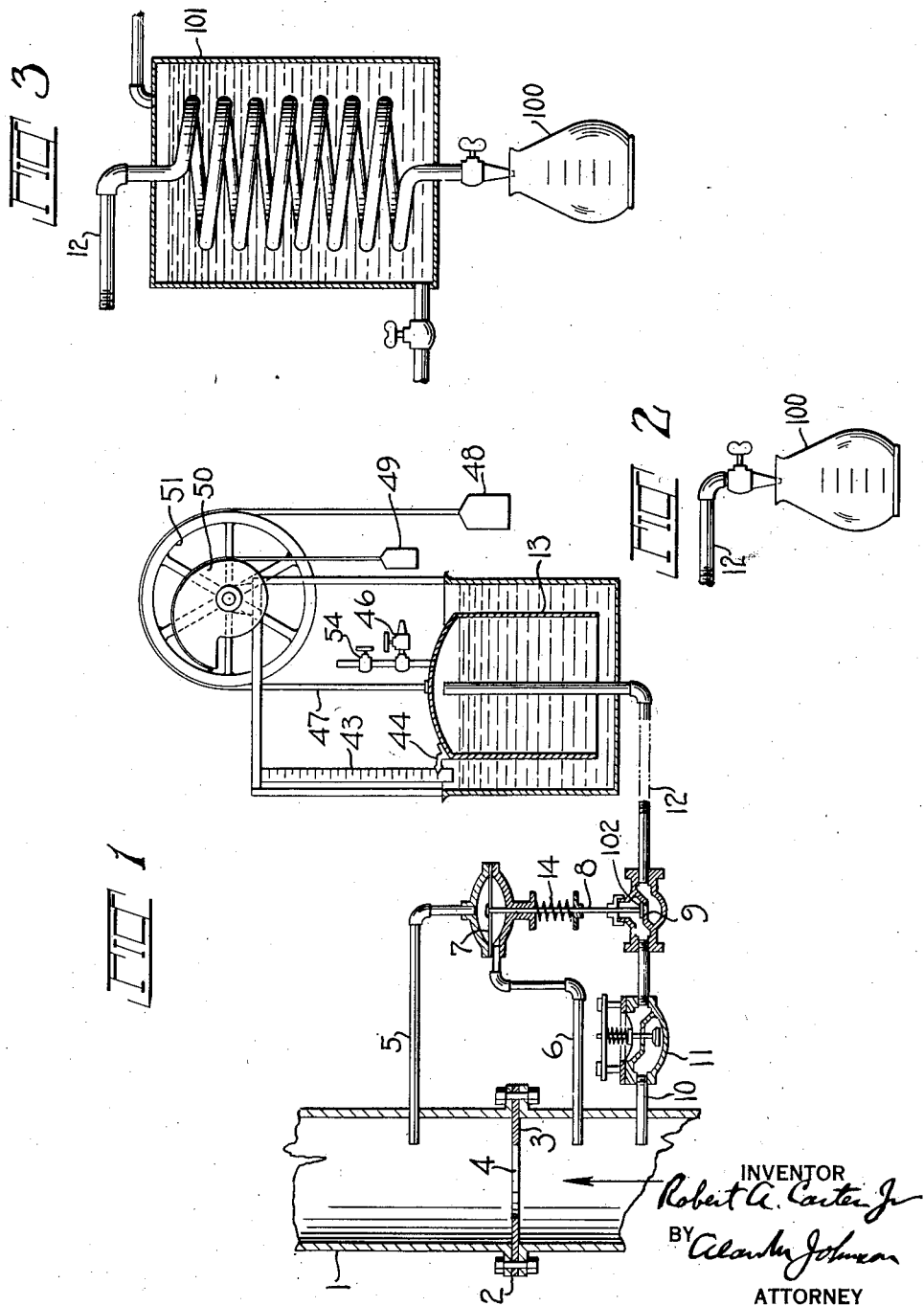

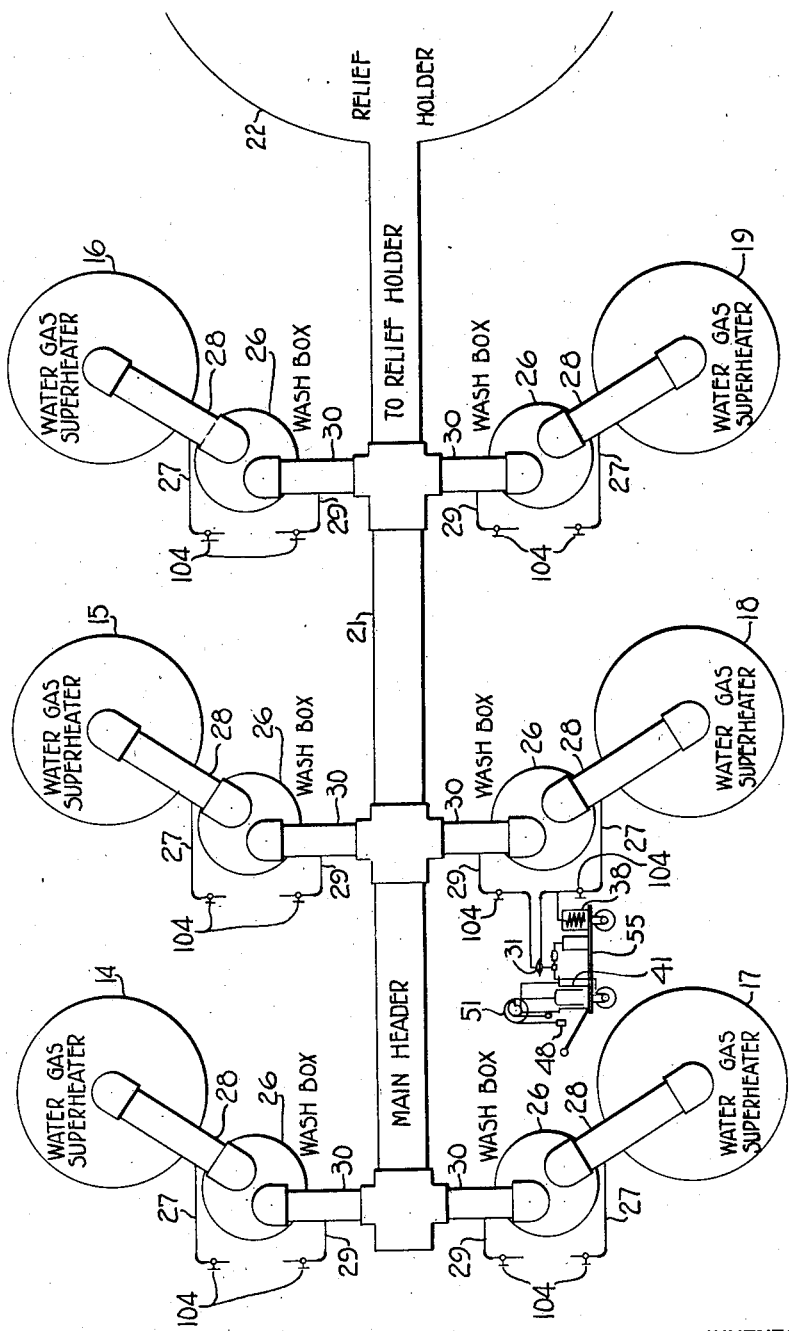

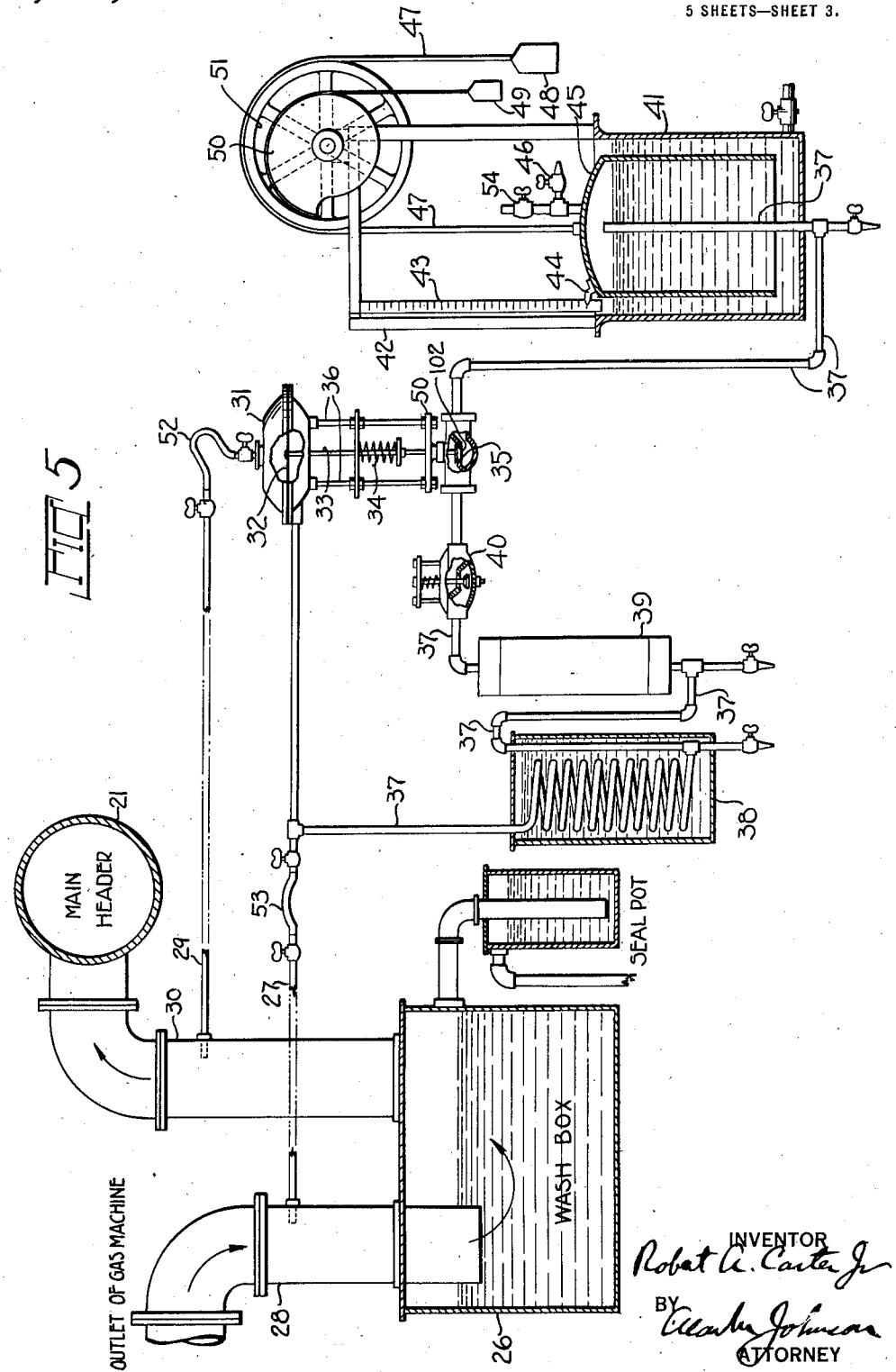

R. A. CARTER, Jr.
METHOD OF SAMPLING A LIQUID, VAPOROUS, OR GASEOUS PRODUCT.
APPLICATION FILED JULY 3, 1919.
1,364,035.
Patented Dec. 28, 1920.
5 SHEETS—SHEET 4.
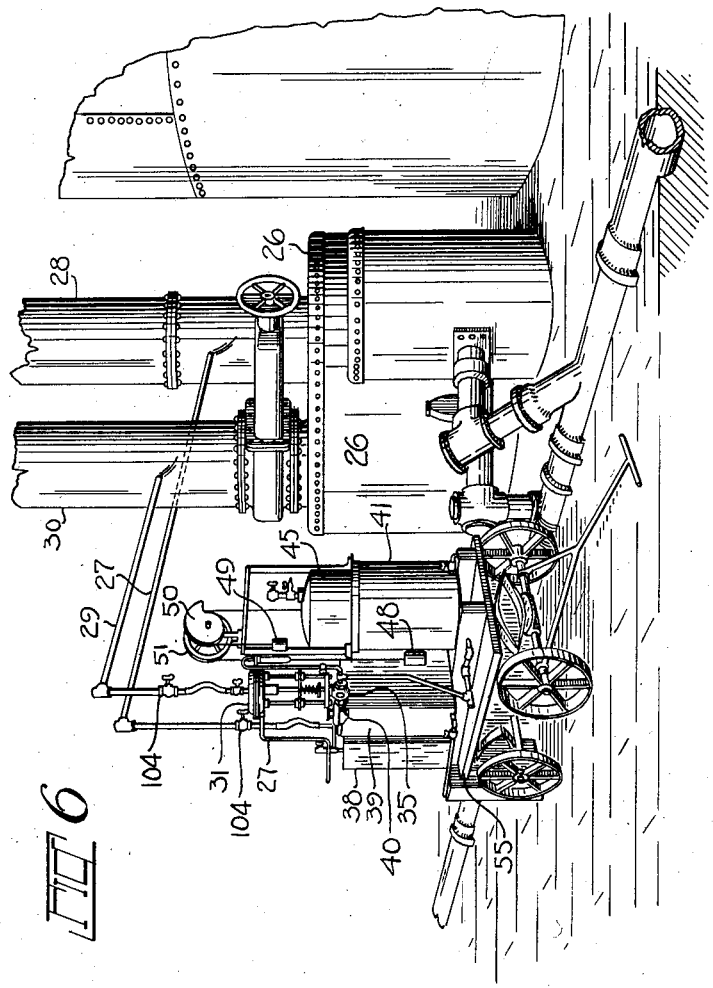
INVENTOR
Robert A. Carter Jr.
BY
Clark Johnson
ATTORNEY

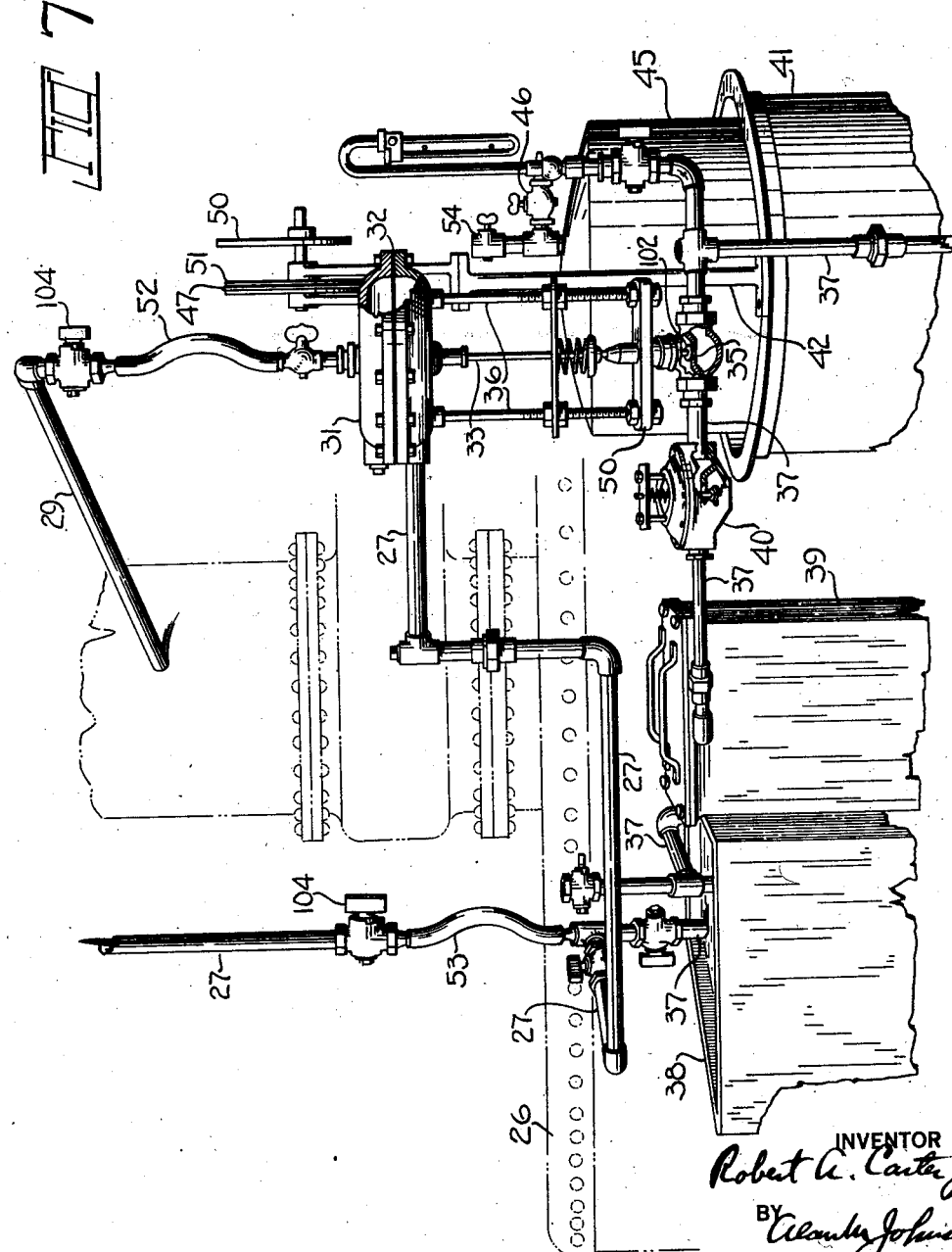

UNITED STATES PATENT OFFICE.

ROBERT A. CARTER, JR., OF BAY RIDGE, LONG ISLAND, NEW YORK.

METHOD OF SAMPLING A LIQUID, VAPOROUS, OR GASEOUS PRODUCT.

1,364,035.  Specification of Letters Patent.  Patented Dec. 28, 1920.

Application filed July 3, 1919. Serial No. 308,680.

*To all whom it may concern:*

Be it known that I, ROBERT A. CARTER, Jr., a citizen of the United States, residing at Bay Ridge, L. I., in the county of Kings and State of New York, have invented certain new and useful Improvements in Methods of Sampling a Liquid, Vaporous, or Gaseous Product, of which the following is a specification, taken in connection with the accompanying drawings.

My invention relates to the method and apparatus of sampling a liquid, vaporous or gaseous product; and also to a new method and apparatus for sampling water gas and facilitating its more economical and scientific manufacture.

My method and apparatus is adapted automatically to sample fluids, vapors and gases passing at a uniform or varying rate of flow to obtain therefrom an accurate sample of the gas, vapor or fluid which is representative of both the quantity and quality produced or passing a given point, in a given test period of any desired duration.

My method and apparatus may be used in testing products passing from a still, or any liquid, gaseous or vaporous product passing through a pipe. In every instance it will automatically obtain a correct sample of the quality of the material, however much the quality may have varied during the test period and at the same time will give the correct quantity of the product manufactured or passed during the test period, however the rate of production may have varied.

In the commercial manufacture of many gases and fluids their rate of production varies. At one period they may be manufactured at a comparatively rapid rate and at another period at a much slower rate. Likewise the quality wil greatly vary during different periods of their manufacture. It is, therefore, clear that a sample of such gas or fluid taken at one step or stage of its manufacture would not be truly representative of either the quantity or quality throughout the entire period of production or flow of such gas or fluid, from the source at which it is being manufactured. At one portion of its manufacture it may be very rich, at another portion very lean; at another portion or step, its rate of manufacture may be very fast, and at another step of its manufacture very slow.

By my invention I can take the flow of such a gas, vapor or fluid, which will have varying rates of flow and the quality of which will vary at different steps of its manufacture, and obtain a sample which will accurately show both the quality and quantity of the product being manufactured during the test period. It is immaterial whether the rate of flow is uniform or not. The test period may, of course, vary with different gases, vapors and fluids as it may be found desirable or expedient, having in view the particular data which it is desired to obtain.

In the commercial manufacture of many gases, vapors and fluids it is the practice to direct the product from several units into a common container or header for purposes of purification and storage. It is, therefore, difficult, and in most cases impossible, to determine the efficiency of production of any one unit, the total product being an evidence only of the average efficiency of all.

My method and apparatus is adapted to automatically withdraw from one unit, or from each unit in turn, a sample of its product which is not only the measure of the quantity of product from this unit, but having been collected at a rate dependent upon and proportional to the rate of production is a truly representative sample from which can be determined the quality of product of this one unit, or of each unit in turn for comparative purposes.

My invention is particularly adapted for use in the manufacture of water gas.

Due to the changing nature of the fuel used, the different periods of running, blowing, coaling, and recheckering as the manufacture of water gas is now conducted, are all subject to change, to suit current conditions. These changes are of necessity more or less a matter of rule of thumb or guess work. One superintendent may blow his water gas machine three minutes and run five minutes, another on the same type of gas machine, or its equivalent, will employ a cycle of blowing two minutes and running four minutes; another superintendent may blow three minutes and run six minutes depending on conditions. What is the correct length of time to blow and run for any given fuel or mixture of fuels is largely a matter of opinion or guess work with each superintendent. Conditions are constantly changing and no general rule should be applied to all machines alike. What method may be prescribed for one machine may not be suitable for another, nor even for the same machine twelve hours later.

One object of my invention is to eliminate this rule of thumb and guess work as to the proper periods of running and blowing, and schedule of up and down runs, by accurately and positively determining the efficient operation of each machine independently of the rest, and establishing scientifically what is the most economical and proper periods to blow and run the particular water gas machine that may be tested, under the particular conditions then pertaining.

Sometimes a water gas machine is cleaned every twelve hours. The proper interval between cleaning periods is more or less guess work depending largely on fuel and method of operation. Under some conditions a water gas machine may run ten or more hours without the necessity of cleaning while under other conditions such identical machine should be cleaned in eight hours or less. To clean the machine, according to a fixed schedule, before it is necessary cuts the machine out of the set or battery before there is any proper need and consequently increases the expense of operation to that extent. To run a machine after it needs cleaning leads to the manufacture of a poor product and makes the machine run below normal. By my invention it can be exactly determined when each gas machine should be cleaned. Therefore, this guess work in the manufacture of water gas is eliminated.

It is the practice in the art, to recheck a water gas machine after a certain number of hours of operation, usually after a thousand hours. This also is guess work or the opinion of the superintendent, but opinions differ as to the proper interval. There is today no accurate manner of telling exactly when such a machine should be recheckered. If it is recheckered before it is really necessary, the expense of manufacturing the gas is increased; if it is not recheckered when it should be, the product deteriorates. Some machines may still be operating efficiently in quantity and quality of product even after fifteen hundred hours of operation. On the other hand, due to improper operation, it might be plugged up in seven hundred hours. In the first case, to cut the machine out of the set or battery on the thousandth hour, to rechecker it would be a waste and unnecessarily add to the expense of operation. In the second case, not to cut it out when it became plugged up, after seven hundred hours of operation, would also add to the expense because that machine would be below normal and be turning out a product unsatisfactory both in quantity and quality. By my invention it can be determined when the efficiency of a machine drops to a point where rechecking would be advisable.

It is well known that no two runs are exactly alike. Successive runs between period of coaling will vary in the quantity and quality of the gas produced, and these conditions will change depending on different kinds of coal or coke used in coaling. If the latter is used for coaling it is more rapidly consumed and it is therefore, necessary to coal up more frequently than when using coal. How much more frequently is a matter of opinion and difficult of determination with accuracy. By my invention the desirability of coaling up at one interval rather than another can be positively determined when either different grades of coal or coke, or different mixtures of the two, are employed.

By my invention the relative work of two different gas makers on the same gas machine can be studied to determine the superiority of one man over the other.

In the normal operation of a water gas plant no two machines are operating under exactly the same conditions: one machine may have just coaled up, while another may be just about to coal up, and the rest of the machines under conditions intermediate to this. One machine might have just been cleaned while another was about due for cleaning and the rest having run anywhere from two to eight hours since cleaning. One machine may have been recently recheckered; while the others are of various ages running from 300 to 1200 hours of operation, and yet, owing to lack of definite information as to the independent performance of each machine, it is common practice to prescribe substantially the same schedules for one machine as for another.

By my invention it is possible to study the performance of each machine independently of the others and to prescribe such method of operation for each as will keep each machine to its highest possible efficiency, until by such independent investigation it is found desirable to cut a machine out of operation either for cleaning or rechecking. In this manner the total product will be greater per machine and be of better average quality.

Other numerous advantages will be described in the specification and pointed out in the claims, and will be clearly understood by those skilled in the art. My invention covers not only the method but also the apparatus for carrying out that method.

The accompanying drawings are very largely diagrammatic and at best show only one form of the apparatus for carrying out my new improved method.

Figure 1 is a diagrammatic view showing the simplest form of my apparatus for sampling a gaseous product;

Fig. 2 is a diagrammatic view of a container or bottle for collecting a sample of a liquid when my invention is used for sampling a liquid product;

Fig. 3 is a diagrammatic view of a condenser and a container when my invention is used to sample vapors which at normal temperatures are liquids;

Fig. 4 is a dagrammatic view of a set or battery of six water gas machines, and my testing apparatus;

Fig. 5 is a view of my testing apparatus connected with the wash box of a water gas machine;

Fig. 6 is a perspective view of my testing machine connected to a water gas machine; and Fig. 7 is a perspective view on an enlarged scale.

The simplest form of my invention is shown diagrammatically in Fig. 1, where it is used to sample a gaseous product flowing in pipe 1. This pipe is provided with a fixed resistance 2 consisting of a disk 3 in which is an orifice 4 somewhat smaller than the diameter of pipe 1. The pressures on either side of the fixed resistance 2 are transmitted through pipes 5 and 6 respectively to the two sides of a diaphragm 7. The movement of this diaphragm, by means of the rod 8, is transmitted to the valve 102 controlling the adjustable orifice 9. The sample of gas is passed from pipe 1 through pipe 10, through the regulating governor 11, then through the adjustable orifice 9, then through pipe 12 into the counterweighted receiver 13.

In the normal operation of this simple form of my apparatus, the gas, flowing in the direction indicated, will have a greater pressure in front of the disk 3 than behind it due to the retarding effect of the fixed resistance 2. The pressure transmitted through pipe 6 to the chamber below the diaphragm 7 will, therefore, be greater than the pressure transmitted through pipe 5 to the chamber above the diaphragm 7. The diaphragm will, therefore, move upward, its movement being somewhat resisted by the regulating spring 14. A sample of the gas will then pass through pipe 10, through the pressure regulating governor 11 and then at uniform pressure through the partially opened orifice 9, through pipe 12 and be collected in the counterweighted receiver 13.

If the rate of flow of the gas in pipe 1 increases, then the fixed resistance 2 will cause a correspondingly greater difference in the pressure transmitted to the diaphragm 7 and the orifice 9 will be opened wider and a correspondingly greater quantity of gas will pass through to the receiver 13. If the flow of gas ceases there will be no difference in pressure and the diaphragm 7 will return to its normal position and the orifice 9 will close so that even though there may still be pressure in pipe 1 no gas can pass to the receiver.

When instead of sampling gases, my apparatus is used for sampling liquids, the only change is in the substitution of a bottle 100, Fig. 2, or other suitable container for liquids, in place of the gas receiver or holder 13. The action of the apparatus is identical in the two cases.

Also when sampling vapors, which at normal temperatures are liquids, a bottle 100 is used to collect the sample when by means of the condenser 101, Fig. 3 it has become liquid.

If the rate of flow of the vapor, gas or liquid in the pipe 1 is irregular or not uniform due to different steps in its manufacture, producing different quantities of the product, or from any other cause, the flow through the orifice 9 will also vary, but it will vary at a rate dependent upon and exactly proportionate to the variation in the rate of production or rate of flow of the gas, vapor or liquid in the pipe 1. That is, when the velocity of the liquid or gas is great in the pipe 1, the drop in pressure on the two sides of the fixed resistance 2 will also be correspondingly great, and this will be transmitted to the diaphragm 7 lifting it and opening the orifice 9 so that a greater quantity of the gas or fluid will pass through the device on its way to the sample receiver or holder 13 or 100, as the case may be. When, due to a decrease in velocity, the difference in pressure in the pipe 1 falls, its action will be immediately communicated to the diaphragm 7 which will partially close the orifice 9 diminishing the quantity of liquid or gas passing to the receiver 13 or 100.

The quantity of the sample taken, bearing a fixed proportion to the total quantity passing through pipe 1, is a dependable and accurate measure of the quantity which it represents and, having been collected at a rate dependent upon and proportional to the rate of production, is a truly representative sample of the quality of that material, however the quality or rate of flow may have varied during the testing period. The receiver 13 may be provided with a scale calibrated to read in terms of the total quantity of gas or liquid which is passed through the pipe 1 during the testing period, as shown in Fig. 5.

By withdrawing, in any suitable manner, the liquid or gas from the receiver 13 or 100 a sample of the gas or fluid passing through the pipe 1 may be obtained, which sample will be an accurate and true sample because it will have been taken at a rate at all times exactly proportioned to the rate of production, or rate of flow, of the gas or liquid through the pipe 1, during the period that the testing machine is in operation.

This sample may be analyzed by the same method as is normally employed upon the entire product and the quality of the product of one unit so determined.

My invention is particularly adapted for use in the manufacture of water gas.

For many years the gas industry has felt the need, in their water gas plants, of some method of determining the relative performance of their water gas sets; some facility for the investigation of water gas operation which would disclose the quantity or the nature of the product of individual machines in the battery, or set.

Many devices experimented with have depended upon the determination of the momentary rate of flow by means of Pitot tubes, the reading from which of static and dynamic pressure can be made to show, with fair accuracy, the rate of production at a given moment, and the application of several of such readings and calculations determine approximately the gas made in a given run.

So also has been the method employed in determining the quality of product. A snap sample is taken on the second or third minute of a run, or a series of samples are taken, one each minute, or a continuous sample is taken at a uniform rate through the entire run. In each case the rate of production is necessarily disregarded. Samples so taken are not indicative of the quality of gas which that machine is making.

In order to determine the relative efficiency of the several machines in operation or in order to determine the relative efficiency of one machine under the varying conditions incident to normal operation, it is necessary to be able to determine at any time the quantity and the quality of the gas which that machine or each machine in turn is producing.

It is customary in gas plants to use a plurality of water gas machines connected to one draw-off header which takes the gas from that battery or set of water gas machines into a common gas holder or receiver.

I have shown diagrammatically in Fig. 4, for purpose of example, a battery of six water gas machines designated 14, 15, 16, 17, 18, and 19, respectively, all connected with a common draw-off header 21 leading to a common gas holder 22. Where the product of these different gas machines are all pooled and gathered into one receiver 22, it is impossible, under the present method of manufacture, to determine whether or not any particular water gas machine of the battery or set is properly functioning; that is, whether or not it is above or below normal. Of course, where the entire battery is not acting satisfactorily a gas maker can check up by a determination of the total product and by an investigation of the average quality of the total product. He is, however, unable to determine exactly how each one of the gas machines in his battery is working and whether it is normal or subnormal.

By my invention it can be demonstrated exactly what each one of the water gas machines is doing and how it might best be operated as to schedule of run and when it should be cleaned, when it should be coaled, and when it should be rechecked. With the accurate knowledge which can be furnished by my invention the cost of making water gas can be greatly reduced as guess work is eliminated, and the manufacture is placed upon a more scientific and efficient basis.

My method and apparatus which can be applied to any machine or to all of the machines each in turn, not only will automatically determine the quantity of gas made during a run but also will collect a representative sample of the gas, not at a uniform rate, but at a rate dependent upon and proportional to the rate of production of that machine, and independent of the performance of other machines in operation in that battery, the sample so taken truly representing the product of that machine both in quantity and quality.

In applying my invention to a water gas machine, any suitable fixed resistance between the outlet of the machine and the main header may be employed, and become, in effect the equivalent of the fixed resistance 2 shown in Fig. 1.

I preferably employ the wash box 26 as my fixed resistance and connect the pipe 27, Figs. 4 and 5, with the inlet 28 to the wash box and the pipe 29 with the outlet 30 from the wash box. The pipe 29, Fig. 5 is connected to one side of the chamber 31 and the pipe 27 is connected to the other side of the chamber 31. In this chamber 31 is a diaphragm 32. Connected to the diaphragm 32 is a rod 33 resisted in its movement by spring 34 which rod controls the valve 102, which in turn controls the variable orifice of the testing machine. The chamber 31 with its diaphragm 32, rod 33, valve 102, and orifice 35 constitute a differential governor.

I preferably connect pipe 37 with the pipe 27 that it might serve the double purpose of a feeder pipe for the differential governor and of permitting a portion of the gas to pass through the miniature condenser 38 and miniature scrubber and purifier 39, then through the pressure regulating governor 40, the variable orifice 35 controlled by the valve 102 and thence into the miniature holder 41. This receiver is provided with a frame 42 upon which is mounted a scale 43 calibrated to read in terms of the total quantity of gas produced by the gas machine, a pointer 44 is mounted on the bell 45 and slides upon the scale 43. When desired a suitable quantity of the sample of gas may be withdrawn from the cock 46 and tested in the usual manner to determine the quality, the balance being allowed to go to waste through cock 54.

A flexible cord 47, which is attached at one end to the bell 45, is passed over a wheel 51 and is attached at the other end to the counterweight 48. Another counterweight 49 is also preferably connected with the cam 50 on the wheel 51, in order to overcome the changing weight of the holder due to displacement.

My device is preferably detachably connected with the pipes 29 and 27 by means of the rubber hose connection 52 and 53 respectively.

The apparatus which I have described and which is illustrated diagrammatically in Figs. 4 and 5 is preferably mounted as shown in Figs. 6 and 7, so that it can be moved around from gas machine to gas machine, Of course, there may be one of my testing machines for each gas machine in which case it may not be necessary to have them mounted on a truck 55. The pipes 27 and 29 are provided with cocks 104 which are closed when the testing machine is removed.

In the manufacture of water gas it is the practice to have alternate blows and runs of from three to five minutes duration each. During the blowing period the pressure at the outlet 30 of the wash box 26 is greater than at the inlet 28 and the orifice 35 is closed. The holder stands at zero. The instant the cap goes on, the pressure at the inlet 28 to the wash box 26 is greater than at the outlet 30 due to the gas being produced and the orifice 35 is automatically opened to a point corresponding to the drop in pressure between the inlet and outlet of the wash box, and a stream of gas passes through the orifice 35 at a rate proportional to the rate of production. This rate decreases as the run progresses till, when the production of gas ceases and the cap is lifted, the orifice 35 is closed due to the pressure on the outlet of the wash box being the greater, and the pointer 44 on the bell 45 comes to rest indicating how much gas has been made. As the gas, so collected, is run to waste through the cock 54 during the blow, a small sample is taken from the cock 46 for analysis, the same as is applied to the total production of all machines. It will, therefore, be seen that during the run of the particular gas machine being tested the diaphragm 32 will be so operated automatically by the pressure of the gas in the chamber 31 as to automatically reduce or enlarge the orifice 35. Assuming that the rate of gas produced from the gas machine is not uniform but fluctuates, the size of the adjustable orifice 35 will also automatically vary, for when the flow is greatest the diaphragm will be lifted correspondingly and permit an increased quantity of gas to pass into the miniature holder or receiver 41. When the flow slackens, as it will on each run, the diaphragm 32 is correspondingly operated to reduce the size of the orifice 35 so that less gas will pass into the miniature receiver 41. When the run of that particular gas machine is stopped and the blow is started the diaphragm 32 will be operated to close the valve 102 and stop the orifice 35 which will not only terminate the taking of a sample but will prevent the escape of any of the gas from the holder 41.

This will be the position of the parts until the gas machine, upon which the test is conducted, is again placed on the run, when the pressure on the inlet side of the diaphragm 32 will again lift the rod 33 and operate the valve 102 to open the orifice 35, so as to again permit a sample of the gas produced to pass into the miniature holder 41, at a rate exactly proportionable to the rate of production of the gas in that particular gas machine at that time.

By my invention I make possible the solution of many problems incident to water gas manufacture and eliminate the guess work heretofore unavoidable in the operation of a water gas generator house.

The schedule of up and down runs and the cycle of runs and blows, prescribed by however experienced a superintendent, are very largely guess work as previously stated, particularly in the larger plants and in plants where frequent changes in the fuel occur.

The interval of time between coal ups and between cleans and even the number of hours a machine may run before recheckering are prescribed on what has been found by experience to be good practice, but the interval prescribed due to the constantly changing conditions, may be too long in some cases and too short in others.

If a machine is still operating efficiently in quantity and quality of product even after fifteen hundred hours of operation, it is a useless expense to rechecker it. It may run eighteen hundred hours. On the other hand, due to improper operation it might be plugged up in seven hundred hours.

Sometimes, when a machine has not been properly cleaned or when the fuel is bad, the make falls off after six or seven hours of operation; at other times it may operate efficiently for twelve hours. To clean on a fixed schedule, disregarding the performance of individual machines, necessarily results in more or less inefficiency.

Sometimes a plant will switch from all coke to all coal as fuel, or may, from day to day, vary the percentage of a mixture of the two. The interval properly required between cleans is not the same for the two fuels, nor should the interval between coaling up be the same.

All of these problems are susceptible of correct solution with my invention and the performance of each individual machine in a battery or set can be followed and its relative efficiency be studied and the rule of thumb and guess work be eliminated.

To be able to determine the quantity of gas each machine is making and at the same time to be able to take a sample for analysis of that gas at a rate correspnoding to the rate of production, is to be able to control scientifically the results in a large plant just as though there were only one gas machine in operation.

Heretofore the opportunity for scientific research in a plant operating more than one machine has been limited by the fact that the total product of all machines is not the result of any one condition and cannot be identified as characteristic of any one condition. There may be several machines operating at once, some blowing, some running but those running may be, and probably would be, at different stages of the run. One machine may have just coaled up, another just about to coal up, and the others at intermediate points. One machine may have just been cleaned, another be just due for cleaning and the others anywhere from two to eight hours since cleaning. A snap sample of gas taken from the main header 21 would indicate the average product at that moment, and would be indicative of the average efficiency of all machines, but the sample cannot be identified as the result or effect of any one combination of conditions. One could not say that this is a sample of gas taken on the first run after coaling up, or the first hour after a clean.

By my invention each sample of gas taken can be identified. It can be analyzed and the analysis labeled with the quantity of gas produced and can be marked as the product of a certain machine, on a certain run since coaling and since cleaning. By this manner a series of such examinations would disclose what takes place in an individual machine under the widely varying condition, under which that machine is normally operated.

By the employment of this device, experiments may be more scientifically conducted and the results thereof be more conclusively obtained and more comprehensively tabulated and charted.

Needless to say that with my invention great economies can be practised, for a maximum efficiency of each gas machine can be established under all working conditions, which will not only insure a better and uniform product but by eliminating waste of labor and materials, the cost of manufacturing the water gas will be greatly reduced.

Having thus described this invention in connection with different illustrative embodiments thereof, to the details of which I do not desire to be limited, what is claimed as new and what is desired to secure by Letters Patent is set forth in the appended claims.

What I claim is:—

1. The method of accurately measuring and sampling a liquid vaporous or gaseous product of uniform or varying flow and quality consisting in passing a portion of said product at uniform pressure through an adjustable orifice and permitting a greater quantity of the liquid or vaporous or gaseous product to automatically pass said orifice when the pressure in the main increases, and automatically reducing the quantity of said liquid or vaporous or gaseous product as the pressure in the main decreases.

2. The method of accurately measuring and sampling a liquid, vaporous or gaseous product of uniform or varying flow and quality consisting in passing a portion of said product at uniform pressure through an adjustable orifice and permitting a greater quantity of the liquid or vaporous or gaseous product to automatically pass said orifice when the pressure in the main increases, and automatically reducing the quantity of said liquid or vaporous or gaseous product as the pressure in the main decreases and collecting said sample of said liquid, vaporous or gaseous product at a rate at all times bearing a fixed ratio to the rate of production to determine accurately the quantity and quality of the product being manufactured.

3. The method of accurately measuring and sampling a liquid vaporous or gaseous product of uniform and varying flow and quality consisting in passing said liquid, vaporous or gaseous product through a fixed resistance, and permitting the difference in pressure on the two sides of the fixed resistance to automatically control the passage of a sample of said liquid, vaporous or gaseous product through a tap, a greater quantity of the sample being automatically passed through the tap when the pressure in the main increases, and automatically reduced by the difference in pressure when the pressure in the main decreases.

4. The method of accurately measuring and sampling a liquid, vaporous or gaseous product of uniform and varying flow and quality consisting in passing said liquid, vaporous or gaseous product through a fixed resistance, and permitting the difference in pressure on the two sides of the fixed resistance to automatically control the passage of a sample of said liquid, vaporous or gaseous product through a tap, a greater quantity of the sample being automatically passed through the tap when the pressure in the main increases, and automatically reduced by the difference in pressure when the pressure in the main decreases and collecting said sample of said liquid, vaporous or gaseous product.

5. The method of accurately measuring and sampling a liquid, vaporous or gaseous product of uniform and varying flow and quality consisting in passing said liquid, vaporous or gaseous product through a fixed resistance, and permitting the difference in pressure on the two sides of the fixed resistance to automatically control the passage of a sample of said liquid, vaporous or gaseous product through a tap, a greater quantity of the sample being automatically passed through the tap when the pressure in the main increases, and automatically reduced by the difference in pressure when the pressure in the main decreases and collecting said sample of said liquid, vaporous or gaseous product at a rate at all times bearing a fixed ratio to the rate of production to determine accurately the quantity and quality of the product being manufactured.

6. The method of accurately measuring and sampling the product from a water gas machine consisting in passing a portion of said product at uniform pressure through an adjustable orifice and permitting a greater quantity of the product to automatically pass said orifice when the pressure in the main increases and automatically reducing the quantity of said product as the pressure in the main decreases.

7. The method of accurately measuring and sampling the product from a water gas machine consisting in passing a portion of said product at uniform pressure through an adjustable orifice and permitting a greater quantity of the product to automatically pass said orifice when the pressure in the main increases and automatically reducing the quantity of said product as the pressure in the main decreases and collecting said gas at a rate at all times bearing a fixed ratio to the rate of production.

8. The method of accurately measuring and sampling the product from a water gas machine consisting in passing a portion of said product at uniform pressure through an adjustable orifice and permitting a greater quantity of the product to automatically pass said orifice when the pressure in the main increases and automatically reducing the quantity of said product as the pressure in the main decreases and collecting said gas in a receiver calibrated to read in terms of the total quantity of gas produced by the gas machine.

9. The method of accurately measuring and sampling the product from a water gas machine consisting in passing said gas through a fixed resistance and permitting the difference in pressure on the two sides of the fixed resistance to automatically control the passage of a sample of said gas through a tap, a greater quantity of the sample gas being automatically passed through the tap when the pressure in the main increases, and automatically reduced by the difference in pressure when the pressure in the main decreases.

10. The method of accurately measuring and sampling the product from a water gas machine consisting in passing said gas through a fixed resistance and permitting the difference in pressure on the two sides of the fixed resistance to automatically control the passage of a sample of said gas through a tap, passing a sample of the gas at uniform pressure, through the tap, a greater quantity of the sample gas being automatically passed through the tap when the pressure in the main increases, and automatically reduced by the difference in pressure when the pressure in the main decreases.

11. The method of accurately measuring and sampling the product from a water gas machine consisting in passing said gas through a fixed resistance and permitting the difference in pressure on the two sides of the fixed resistance to automatically control the passage of a sample of said gas through a tap, passing a sample of the gas at uniform pressure, through the tap, a greater quantity of the sample gas being automatically passed through the tap when the pressure in the main increases, and automatically reduced by the difference in pressure when the pressure in the main decreases and collecting said gas at a rate at all times bearing a fixed ratio to the rate of production.

12. The method of accurately measuring and sampling the product from a water gas machine consisting in passing said gas through a fixed resistance and permitting the difference in pressure on the two sides of the fixed resistance to automatically control the passage of a sample of said gas through a tap, passing a sample of the gas at uniform pressure, through the tap, a greater quantity of the sample gas being automatically passed through the tap when the pressure in the main increases, and automatically reduced by the difference in pressure when the pressure in the main decreases and condensing and purifying said sample of gas to obtain an accurate representative sample of the gas produced.

13. The method of accurately measuring and sampling the product from a water gas machine consisting in passing said gas through a fixed resistance and permitting the difference in pressure on the two sides of the fixed resistance to automatically control the passage of a sample of said gas through a tap, passing a sample of the gas at uniform pressure, through the tap, a greater quantity of the sample gas being automatically passed through the tap when the pressure in the main increases, and automatically reduced by the difference in pressure when the pressure in the main decreases and condensing and purifying said sample of gas to obtain an accurate representative sample of the gas produced and collecting said sample of gas in a receiver.

14. The method of accurately measuring and sampling the product from a water gas machine consisting in passing said gas through a fixed resistance and permitting the difference in pressure on the two sides of the fixed resistance to automatically control the passage of a sample of said gas through a tap, passing a sample of the gas at uniform pressure, through the tap, a greater quantity of the sample gas being automatically passed through the tap when the pressure in the main increases, and automatically reduced by the difference in pressure when the pressure in the main decreases and condensing and purifying said sample of gas to obtain an accurate representative sample of the gas produced and collecting said sample of gas in a receiver calibrated to read in terms of the total quantity of gas produced.

15. The method of accurately measuring and sampling the product from a water gas machine consisting in passing said gas through a wash box and permitting the difference in pressure on the two sides of the wash box to automatically control the passage of a sample of said gas through a tap, passing a sample of the gas at uniform pressure through the tap, a greater quantity of the sample gas being automatically passed through the tap when the pressure in the main increases, and automatically reduced by the difference in pressure when the pressure in the main decreases.

16. The method of accurately measuring and sampling the product from a water gas machine consisting in passing said gas through a wash box and permitting the difference in pressure on the two sides of the wash box to automatically control the passage of a sample of said gas through a tap, passing a sample of the gas at uniform pressure through the tap, a greater quantity of the sample gas being automatically passed through the tap when the pressure in the main increases, and automatically reduced by the difference in pressure when the pressure in the main decreases and collecting said gas at a rate at all times bearing a fixed ratio to the rate of production.

17. The method of accurately measuring and sampling the product from a water gas machine consisting in passing said gas through a wash box and permitting the difference in pressure on the two sides of the wash box to automatically control the passage of a sample of said gas through a tap, passing a sample of the gas at uniform pressure through the tap, a greater quantity of the sample gas being automatically passed through the tap when the pressure in the main increases, and automatically reduced by the difference in pressure when the pressure in the main decreases, and condensing and purifying said sample of gas to obtain an accurate representative sample of the gas produced.

18. The method of accurately measuring and sampling the product from a water gas machine consisting in passing said gas through a wash box and permitting the difference in pressure on the two sides of the wash box to automatically control the passage of a sample of said gas through a tap, passing a sample of the gas at uniform pressure through the tap, a greater quantity of the sample gas being automatically passed through the tap when the pressure in the main increases, and automatically reduced by the difference in pressure when the pressure in the main decreases, and collecting said gas in a receiver calibrated to read in terms of the total quantity of gas produced.

19. The method of accurately measuring and sampling the product from a water gas machine consisting in passing said gas through a wash box and permitting the difference in pressure on the two sides of the wash box to automatically control the passage of a sample of said gas through a tap, passing a sample of the gas at uniform pressure through the tap, a greater quantity of the sample gas being automatically passed through the tap, when the pressure in the main increases, and automatically reduced by the difference in pressure when the pressure in the main decreases, and collecting said gas in a receiver calibrated to read in terms of the total quantity of gas produced and at a rate at all times bearing a fixed ratio to the rate of production.

20. The combination in a water gas machine of a regulating governor and a differential governor, the latter connected on opposite sides of a fixed resistance in the path of the product of the water gas machine, said differential governor controlling an adjustable orifice through which passes some of the product of the machine and adapted to increase or decrease the quantity of the gas passing through the orifice, and means to collect the gas.

21. The combination in a water gas machine of a regulating governor and a differential governor, the latter being connected by pipes leading to opposite sides of a fixed resistance in the path of the product of the water gas machine, said differential governor controlling an adjustable orifice through which passes some of the product of the machine and adapted to increase or decrease the quantity of the gas passing through the orifice, and means to collect the gas at a rate at all times bearing a fixed ratio to the rate of production of the machine.

22. The combination in a water gas machine of a regulating governor, of an adjustable orifice controlled by a diaphragm which in turn is controlled by the product of the machine for the purpose of controlling the passage of gas from the machine through the orifice, and means to condense and purify the gas that passes through said orifice, and a receiver calibrated to read in terms of the total quantity of gas produced by said gas machine during the testing period.

ROBERT A. CARTER, JR.

Witnesses.
 EDGAR S. MURRAY,
 JNO. J. VISBROCK.